(No Model.)
C. E. SENNA.
STOP VALVE.
No. 301,761.                    Patented July 8, 1884.
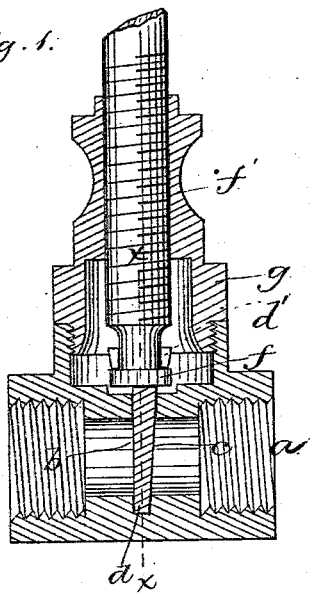
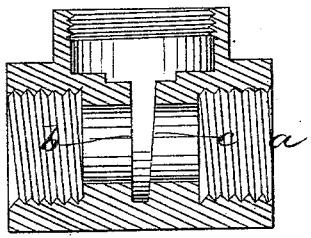
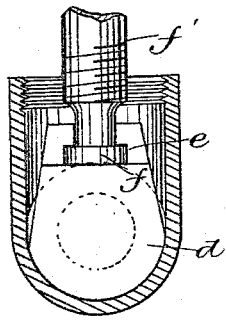
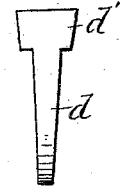
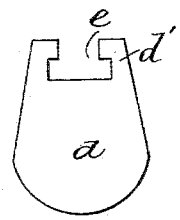
Witnesses.                                Inventor

UNITED STATES PATENT OFFICE.

CHARLES E. SENNA, OF BOSTON, MASSACHUSETTS.

STOP-VALVE.

SPECIFICATION forming part of Letters Patent No. 301,761, dated July 8, 1884.

Application filed January 7, 1884. (No model.)

*To all whom it may concern:*

Be it known that I, CHARLES E. SENNA, of Boston, in the county of Suffolk and State of Massachusetts, have invented certain Improvements in Stop-Valves, of which the following is a specification.

This invention relates to straight-way valves, and has for its object to provide an improved construction combining cheapness, simplicity, and durability.

The invention consists in the combination, with the casing or shell having seats or guides for a sliding valve, arranged in somewhat close proximity to each other, for a purpose hereinafter described, of a solid valve made in a single piece, swiveled to a threaded valve-stem in such a manner that it can be adjusted laterally independently of the stem, as I will now proceed to describe.

Of the accompanying drawings, forming a part of this specification, Figure 1 represents a longitudinal section of my improved valve. Fig. 2 represents a transverse section on line $x\ x$, Fig. 1. Fig. 3 represents a longitudinal section of the shell or casing. Fig. 4 represents a side view of the valve detached. Fig. 5 represents an edge view of the same.

The same letters of reference indicate the same parts in all the figures.

In the drawings, $a$ represents the shell or casing, having the valve-seats $b\ c$. The valve or gate is composed of a single thin solid piece or plate, $d$, formed to fit the seats $b\ c$, and an enlarged or widened part, $d'$, above the part $d$, said widened portion having a T-shaped slot, $e$, which receives the shouldered end $f$ of the stem $f'$, said shouldered end and slot constituting a swivel-connection, which enables the stem to slide the valve without rotating it. The slot $e$ extends entirely across the part $d'$ of the valve, or from side to side thereof, so that the valve can be adjusted sidewise on the stem, and can therefore adjust itself to the seats $b\ c$. Said seats do not therefore require to be located with particular reference to the valve or stem. The valve is so proportioned that when forced by the stem into the space between the seats $b\ c$ it will bear closely against said seats and tightly close the waterway. The branch casing or bonnet $g$, in which the valve-stem works, is provided with a stuffing-nut, as usual.

It will be seen that the solid construction of the valve enables it to be made so thin that the seats $b\ c$ are brought into close proximity to each other, as shown in Figs. 1 and 3, so that steam, in passing through the valve, has not room to expand sufficiently in the space between said seats to enable it to attack and wear away the seat against which it would impinge if sufficiently expanded.

I am aware that a valve has been described in which a projection from the gate engages a shoulder on the valve-stem. In such case, however, the gate is not a continuation of the line of the stem, but is in a plane parallel therewith, and the movement of the stem must have more or less tendency to cramp the gate.

I claim—

1. In a straight-way valve, the combination, with the valve-seats, of the gate $d$, having an upper widened portion, $d'$, said widened part being slotted or cut through from face to back, and having projections from each side toward the center above the slot, and the valve-stem $f$, having a shoulder which enters the slot in part $d'$, so that the gate and stem are in line with each other, substantially as shown.

2. In a straight-way valve, the combination of the casing having seats $b\ c$, the screw-threaded valve-stem $f'$, having a shoulder, $f$, and the valve composed of a single solid thin piece or plate, $d$, and widened portion $d'$, provided with the transverse slot $e$, said slot receiving the shoulder $f$, and extending entirely across the valve, whereby the valve is adapted to be adjusted sidewise upon the stem.

In testimony whereof I have signed my name to this specification, in the presence of two subscribing witnesses, this 15th day of December, 1883.

CHARLES E. SENNA.

Witnesses:
C. F. BROWN,
A. L. WHITE.